United States Patent [19]
Lesea

[11] Patent Number: 5,315,215
[45] Date of Patent: May 24, 1994

[54] HIGH-VOLTAGE SWITCHING CIRCUIT

[75] Inventor: Ronald A. Lesea, Redwood City, Calif.

[73] Assignee: METCAL, Inc., Menlo Park, Calif.

[21] Appl. No.: 53,141

[22] Filed: Apr. 27, 1993

[51] Int. Cl.⁵ .............................................. H05B 37/02
[52] U.S. Cl. ................................... 315/219; 315/160; 315/161; 315/175; 315/307
[58] Field of Search .................. 315/219, 307, DIG. 5, 315/DIG. 7, 244, 160, 161, 175, 205; 363/109

[56] References Cited
U.S. PATENT DOCUMENTS

| | | | |
|---|---|---|---|
| 3,894,262 | 7/1975 | Funston et al. | 315/161 |
| 4,749,914 | 6/1988 | Fehér et al. | 315/175 |
| 5,162,703 | 11/1992 | Schmees et al. | 315/219 |

*Primary Examiner*—Robert J. Pascal
*Assistant Examiner*—Reginald A. Ratliff
*Attorney, Agent, or Firm*—Thomas E. Schatzel

[57] ABSTRACT

A pair of transistors (110 and 112) configured with their channels connected in series. The gate of the "upper" transistor (110) is coupled to a relatively low-voltage, DC power supply voltage by a voltage-clamping and current-steering diode (144); to a relatively high-voltage, DC power supply voltage by the series combination of a current-steering diode (152) and one voltage-clamping zener diode (154 and 156) and coupled to the source of the "upper" transistor by a charge-removing resistor (162).

9 Claims, 1 Drawing Sheet

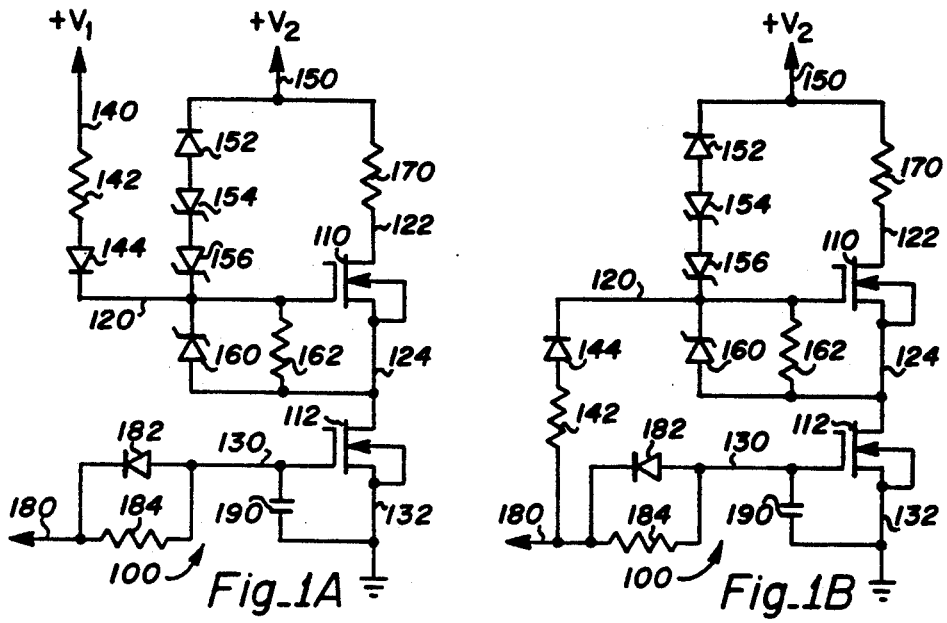
Fig_1A  Fig_1B
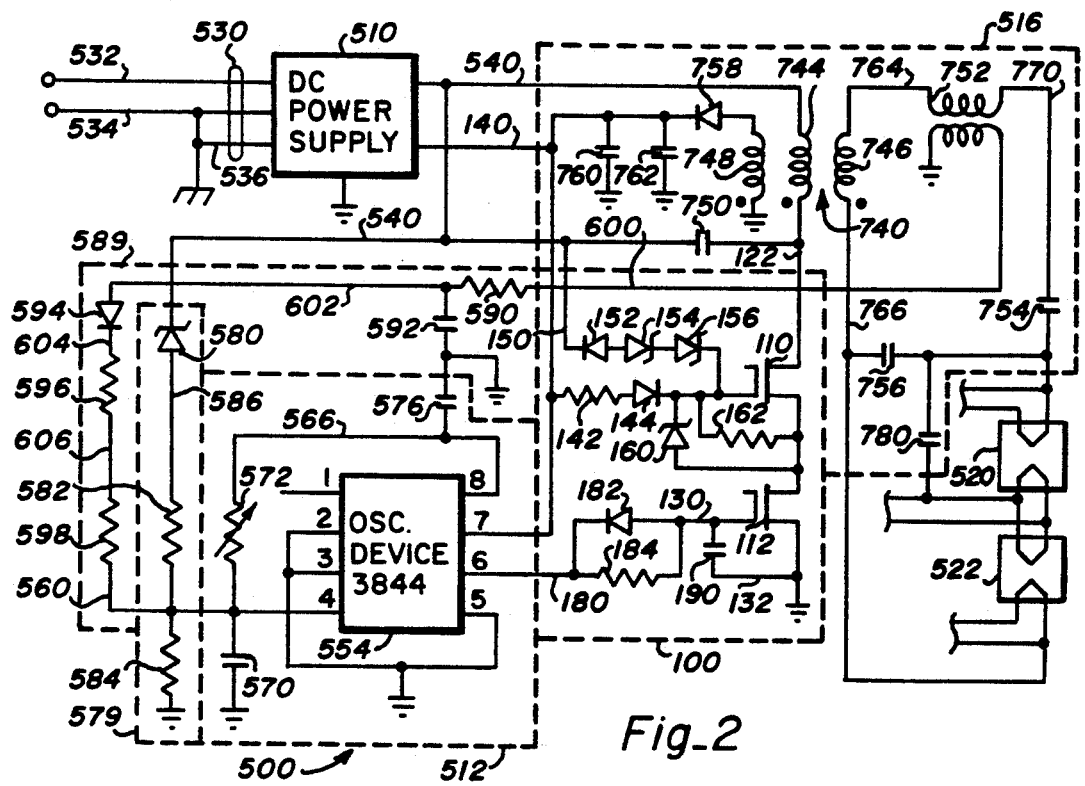
Fig_2

5,315,215

HIGH-VOLTAGE SWITCHING CIRCUIT

BACKGROUND OF THE INVENTION

1. Field of the Invention

The present invention relates to switching circuits generally and more particularly to a high-voltage switching circuit employing relatively inexpensive transistors.

2. Description of the Related Art

It is not uncommon for transistors to be employed in relatively high-voltage switching circuits. However, in most case, the voltages involved subject the transistors to relatively high stresses. Heretofore, to withstand the stresses, it has usually been necessary to employ relatively expensive transistors.

In some prior-art-type switching circuits, two (or more) transistors are configured with their channels connected in series, to reduce the level of stress each of the series-connected transistors must withstand. However, the problem has been one of ensuring that the voltage developed across the series-connected transistors is divided relatively equally. In one prior-art-type configuration, the gate of the "upper" transistor is connected to a fixed low-level potential and the gate of the "lower" transistor is connected to receive a switching signal. Unfortunately, in such a configuration, the "upper" transistor is usually subjected to a disproportionally high level of stress.

One application for high-voltage switching circuits is in electronic ballast circuits employed to drive fluorescent lamps. A "Single-Ended Ballast Circuit," is disclosed in U.S. Pat. No. 5,028,846. Briefly, the above-mentioned circuit employs a DC power supply, a free-running oscillator, a switching circuit (transistor), and a current-limiting (ballasting) network, all configured to generate a high-frequency AC power source on a line. Specifically, the transistor is configured as a switch to be responsive to a signal generated by the oscillator and to be operative to periodically couple the line to a circuit common. For this purpose, the transistor is connected with its gate connected to the output of the oscillator, with a drain connected to the line, and a source connected to the circuit common. The current-limiting (ballasting) network includes a first capacitor connected between the line and the circuit common. In addition, the network includes a transformer (inductive means) having a transformer primary winding connected between a DC power supply potential and the line, and a transformer secondary winding. Finally, the network includes an inductor and two capacitors all connected in series across the transformer secondary winding. Two fluorescent lamps are connected in series across one capacitor. The network is operative to provide an impedance transformation to couple the fluorescent lamps to the high-frequency AC power source developed on the line. Also, the network develops the desired open circuit output voltage for starting the fluorescent lamps. In addition, the network provides the desired source impedance, as seen by the lamps. Also, the network establishes the operating Q for the desired output waveform. Further, the network provides the desired load impedance and phase angle as seen by the transistor for both the operating and open circuit conditions. Finally, the network is operative to provide an inductive power-supply feed for the transistor. Unfortunately, in this ballast circuit, voltage stresses are generated in the switching circuit transistor which require the use of a relatively expensive transistor, especially for AC line source voltages of 240 volts and higher.

SUMMARY OF THE PRESENT INVENTION

It is therefore the primary object of the present invention to provide a relatively low-cost high-voltage switching circuit.

Another object of the present invention is to provide a high-voltage switching circuit in which voltage stresses are relatively equally divided among multiple, series connected transistors.

Yet another object of the present invention is to provide an inexpensive electronic ballast circuit.

Briefly, a preferred embodiment of the invention includes a relatively low-cost high-voltage switching circuit employing a pair of transistors configured with their channels connected in series. The gate of the "upper" transistor is coupled to a relatively low-voltage, DC power supply voltage by a voltage-clamping and current-steering diode, to a relatively high-voltage, DC power supply voltage by the series combination of a current-steering diode and one voltage-clamping zener diode, and to the source of the "upper" transistor by a charge-removing resistor.

These and other objects of the present invention will no doubt become apparent to those skilled in the art after having read the detailed description of the presently preferred embodiment of the present invention which is illustrated in the figures of the drawing.

BRIEF DESCRIPTION OF THE FIGURES IN THE DRAWING

FIG. 1A is a schematic diagram of a preferred embodiment of a high-voltage switching circuit in accordance with the present invention;

FIG. 1B is a schematic diagram of another embodiment of a high-voltage switching circuit in accordance with the present invention; and FIG. 2 is a schematic diagram of an electronic ballast circuit employing the low-cost high-voltage switching circuit shown in FIG. 1A.

DESCRIPTION OF THE PREFERRED EMBODIMENT

FIG. 1A illustrates a high-voltage switching circuit in accordance with the present and referred to by the general reference character 100. Switching circuit 100 employs a pair of transistors 110 and 112. Transistors 110 and 112 are configured with their channels connected in series. The gate of transistor 110 is connected to a line 120, its drain is connected to a line 122, and both its source and the substrate (internally) are connected to a line 124. Transistor 112 is configured with its gate connected to a line 130, with the transistor drain (means) connected to line 124, and with both its source and the substrate (internally) connected to a line 132 which extends to ground. Line 120 is coupled to a line 140 by the series combination of a current-limiting resistor 142 and a voltage-clamping and current-steering diode 144. Further, line 120 is coupled to a line 150 by the series combination of a current-steering diode 152 and at least one voltage-clamping zener diode (means). In FIG. 1A such voltage clamping zener diode means is a pair of zener diodes 154 and 156. In addition, line 120 is coupled to line 124 by the parallel combination of a gate-protecting zener diode 160 and a charge-removing resistor 162. Line 122 is coupled to line 140 by a load (means), represented by a resistor 170. Line 130 is coupled to a line 180 by the parallel combination of a current-steering diode 182 and a resistor 184. Further, line 130 is coupled to a line 132 by a capacitor 190. Switching circuit 100 is configured to receive a relatively low-voltage DC power supply voltage developed between lines 140 and 132 and to receive a relatively high-voltage, DC power supply voltage developed between lines 150 and 132. Further, switching circuit 100 is configured to receive a switching signal externally developed on line 180. Line 132 is referred to herein as a circuit common.

An important aspect of circuit 100 is that the zener breakdown voltage of one or more voltage-clamping zener diodes (means) 154 and 156 establishes the level of the voltage stress each of the transistors 110 and 112 must withstand, in other words, the ratio of the voltages developed across transistor 110 and 112. For a given DC high-voltage power supply voltage, and with transistor 110 and 112 having relatively equal breakdown voltages, the zener breakdown voltages of zener diodes 154 and 156 are selected so as to divide, relatively equally, the level of the voltage stress each of the transistors 110 and 112 must withstand.

When N-channel depletion-mode transistors are employed for transistors 110 and 112, the orientation of the diodes and the DC power supply voltages is as shown in FIG. 1A. Specifically, diode 144 and zener diodes 154 and 156 are configured (oriented) so as to limit (clamp) the excursions of the level of the potential developed on the gate of transistor 110 (on line 120). Diode 144 is connected to prevent the level of the potential developed on line 120 from going (more than one diode-level voltage drop) below the level of the potential developed by the low-voltage DC power supply on line 140. Resistor 140 limits the level of current (charge flow) into the gate of transistor 110 (due to circuit and/or diode and/or transistor parasitics). Zener diode 154 and 156 are connected to prevent the level of potential developed on line 120 from exceeding the level of the potential developed by the high-voltage DC power supply on line 150 by the combination of the zener diode breakdown voltages (plus one diode-level voltage drop). In other words, when 150 volt zener diodes are employed, the zener diodes prevent the level of the potential developed on line 120 from exceeding the level of the high-voltage DC power supply potential plus 300 volts. Diode 152 is configured (oriented) so as to prevent a current from line 150 to line 120, to permit the level of the potential developed on line 120 to go below the level of the high-voltage DC power supply potential.

Zener diode 160 is configured to prevent the level of the voltage developed between the gate and source of transistor 110 (due to circuit and/or diode and/or transistor parasitics) from reaching a level which would otherwise breakdown the gate oxide layer of the transistor 110.

Resistor 162 is configured to remove (discharge) the charge which accumulates on the gate of transistor 110. Specifically, when transistor 112 is on, the gate of transistor 110 (on line 120) is biased at a potential level (one diode-level voltage drop) below the level of the potential developed by the low-voltage DC power supply on line 140. Also, when transistor 112 is on, the source of transistor 110 is biased at a potential level near the circuit common level on line 132 and thereby turning transistor 110 on. Thereafter, when transistor 112 is turned off, a charge accumulation remains on the gate of transistor 110. Resistor 162 removes this charge, turning transistor 110 off, before transistor 110 is turned on again. If transistor 110 were still on when transistor 112 is turned on again, the entire voltage stress would be developed across transistor 112.

In circuit 100, resistor 184 and capacitor 190 are configured to slow down the rise time of the voltage developed on line 130 at the gate of transistor 112, to slow down the rate at which the transistor 112 must discharge parasitic capacitances on line 124 at the transistor drain, to reduce the required peak current requirements of the transistor. Current-steering diode 182 is configured to maintain a fast fall time of the voltage developed on line 130 at the gate of transistor 112. Although N-channel depletion-mode MOS transistors are employed, other types of transistors may be employed.

FIG. 1B is virtually identical to FIG. 1A, with the difference being that the end of resistor 142 not connected to the anode of diode 144 is returned to line 180 (the driving waveform) instead of a relatively low DC voltage. For certain types of devices at certain (higher) frequencies, this connection can reduce certain parasitic effects that otherwise could impair circuit performance.

FIG. 2 is a ballast circuit referred to by the general reference character 500 and employing switching circuit 100. Ballast circuit 500 employs a DC power supply 510; an oscillator 512; switching circuit 100; and a current-limiting (ballasting) network 516, all for driving a number of fluorescent lamps, which are represented by two lamps that are respectively designated 520 and 522.

DC power supply 510 is connected to an AC power line 530 which includes a hot line 532, a neutral line 534 and an (earth) ground line 536. When so connected, DC power supply 510 is operative to receive AC power from line 530 and to develop a pair of DC voltages, including a primary DC voltage on a line 540 and a parasitic DC voltage on line 140, both with respect to a circuit common potential developed on line 132. In one embodiment, to develop the DC voltage on line 140, the line is coupled to line 540 by a resistor (not shown). Preferably, DC power supply 510 receives the AC power from line 530 so as to maximize the power factor the DC power supply presents to the AC power line and to minimize the level of harmonic currents the DC power supply generates on the AC power line. Such a DC power supply is disclosed in U.S. Pat. Nos. 5,021,716 and 5,028,846.

Oscillator 512 is configured to generate on line 180, a high frequency signal preferably having a square-wave shape. Oscillator 512 is configured around an integrated circuit-type device 554, e.g. of the type commonly designated 3844. Specifically, device 554 is configured with pin seven (VCC) connected to DC power supply 510 by parasitic DC voltage line 140, and pin six (OUTPUT) is connected to line 180. Pin two (Vfb), pin three (ISENSE), and pin five (GROUND) are connected to the circuit common. Further, pin four (RT/CT) is connected to a line 560, and pin eight (VREF) is connected to a line 566. An oscillation frequency establishing capacitor 570 is connected between line 560 and the circuit common. Represented by a variable resistor 572, preferably six resistors are connected in parallel between lines 566 and 560. (During production of ballast circuit 500, measurements are made of the power the circuit delivers to a load. Based upon the measurements, a predetermined number of the resistors are cut out of the circuit.) Finally, a bypass capacitor 576 is connected between line 566 and the circuit common. Preferably, capacitor 570 has a capacitance of 4.7 nanofarads; the six resistors represented by resistor 572 have a respective resistance of 560 kilohms, 280 kilohms, 140 kilohms, 69.8 kilohms, 34.8 kilohms, and 4.02 kilohms; and, capacitor 576 has a capacitance of 0.1 microfarads.

A feed-forward circuit 579 is employed for mitigating the effect of ripple on the DC voltage developed by DC power supply 510 on primary DC voltage line 540 (with respect to the circuit common potentials. Specifically, the feed-forward circuit 579 varies the power delivered to fluorescent lamps 520 and 522 by varying the oscillation frequency of frequency modulating) oscillator 512 responsive to the instantaneous level of the DC voltage developed on line 540. As the instantaneous level of the DC voltage developed on line 540 rises, the feed-forward circuit increases the level of the current in capacitor 570. For this purpose, the feed-forward circuit 579 includes a zener diode 580 and a pair of resistors 582 and 584. For coupling the ripple components of the line 540 voltage to a line 586, diode 580 is configured with its cathode connected to line 540 and with its anode connected to line 586. For converting the ripple voltage to a ripple current, resistors 582 and 584 are connected in a voltage divider configuration with resistor 582 connected between lines 586 and 560 and resistor 584 connected between line 560 and the circuit common. In embodiment 500, zener diode 580 is of the type commonly designated 1N5264 and resistors 582 and 584 have a respective resistance of one megohm and 26.1 kilohms. As above indicated, in embodiment 500, the feed-forward circuit 579 varies the oscillation frequency of (frequency modulating) oscillator 512 responsive to the instantaneous level of the DC voltage developed on line 540. In another embodiment, the feed-forward circuit 579 varies the oscillation pulse width (duty cycle) of oscillator 512 responsive to the instantaneous level of the DC voltage developed on line 540.

A feedback circuit 589 is employed for maintaining a constant power level in fluorescent lamps 520 and 522. Specifically, in embodiment 500, the feedback circuit varies the power delivered to the lamps by varying the frequency of oscillator 512 responsive to the level of the current in current-limiting (ballasting) network 516. For this purpose, the feedback circuit includes a resistor 590, a capacitor 592, a diode 594, and a pair of resistors 596 and 598. To develop a sense current, resistor 590 and capacitor 592 are configured to receive and integrate a small sense voltage, which is developed on a line 600 (with respect to the circuit common potential) from the current in network 516. For this purpose, resistor 590 and capacitor 592 are connected in a low-pass integrator configuration with the resistor 590 connected between line 600 and a line 602 and with the capacitor 592 connected between line 602 and the circuit common. For converting the integrated voltage to a current for driving oscillator 512, diode 594 is configured as a current-steering diode with its anode connected to line 602 and its cathode connected to a line 604. Resistor 596 is connected between line 604 and a line 606 and resistor 598 is connected between line 606 and 560. In embodiment 500, resistor 590 has a resistance of thirteen kilohms; capacitor 592 has a capacitance of 2.2 nanofarads; diode 594 is of the type commonly designated 1N4148; and resistors 596 and 598 have a respective resistance of eighteen kilohms and twenty kilohms. As above indicated, the feedback circuit 589 varies the oscillation frequency of oscillator 512 responsive to the level of the current in current-limiting (ballasting) network 516. In another embodiment, the feedback circuit 589 varies the oscillation pulse width (duty cycle) of oscillator 512 responsive to the level of the current in current-limiting (ballasting) network 516.

In the embodiment 500, switching circuit 100 is responsive to the high frequency signal generated on line 180 by oscillator 512 and operative to periodically couple line 122 to line 132 (circuit common). For an AC voltage source of 240 volts, transistors 110 and 112 are each of the type designated 4N70. (A 4N70 transistor has a BVDSS of 700 volts and an RDS(on) of 3.5 ohms.) Zener diodes 154 and 156 are each of the type commonly designated 1N5276 (150 volt) and zener diode 160 is of the type designated 1N5250 (20 volt). In addition, diodes 144 and 152 are each of the type commonly designated 1N4947 and diode 182 is of the type commonly designated 1N4148. Finally, resistors 142, 162 and 184 have a respective resistance of 270 ohms, twenty kilohms, and 270 kilohms and capacitor 190 has a capacitance of one nanofarad.

In one embodiment, current-limiting (ballasting) network 516 includes a transformer (inductive means) 740 having a primary winding 744 and a pair of secondary windings 746 and 748, a capacitor 750, another transformer (inductive means) 752, and a pair of capacitors 754 and 756. As a transformer, transformer (inductive means) 740 is configured both to provide isolation for fluorescent lamps 520 and 522. As an inductor, transformer (inductive means) 740 provides an impedance tranformation. For these purposes, transformer (inductive means) 740 is configured with one end of primary winding 744 connected to DC power supply 510 through DC voltage line 540. The other end of primary winding 744 is connected to the drain of transistor 110 by line 122. Transformer (inductive means) 740 secondary winding 748 is connected to provide DC power for oscillator 512. For this purpose, secondary winding 748 is connected between circuit common and the anode of diode 758, the cathode of which is connected to DC voltage line 140. A pair of filter capacitors 760 and 762 are connected in parallel between line 140 and circuit common. Secondary winding 746 has one end connected to a line 764 and the other end connected to a line 766. Capacitor 750 is connected between the drain of transistor 110 and, in one embodiment circuit common (preferably, the source of transistor 110). In the embodiment 500, capacitor 750 is connected between line 122 and line 540, to reduce the DC voltage (stress) across the capacitor. Transformer (inductive means) 752 is configured as an inductor connected between line 764 and a line 770. Capacitors 754 and 756 are connected in series between lines 770 and 766. Also, fluorescent lamps 520 and 522 are connected in series across capacitor 756. As a starting aid, a capacitor 780 is connected in parallel with fluorescent lamp 520. To develop the small feedback sense voltage, a small number (preferably seven) turns of wire are wound around transformer (inductive means) 752 to form a sense winding. (The small sense voltage is integrated by resistor 590 and capacitor 592 to develop across the capacitor a voltage which is proportional to the level of the current in inductor 752.) The sense winding is connected between circuit common and line 600.

For further details of the above-described limiting (ballasting) network 516, refer to U.S. Pat. No. 5,028,846 of Ronald A. Lesea. In other embodiments, other current-limiting (ballasting) networks are employed which are disclosed in the above mentioned Patent and in U.S. Pat. No. 5,047,691, issued to Ronald A. Lesea and John B. Sampson.

It is contemplated that after having read the preceding disclosure, certain alterations and modifications of the present invention will no doubt become apparent to those skilled in the art. It is therefore intended that the following claims be interpreted to cover all such alterations and modifications as fall within the true spirit and scope of the invention.

I claim:

1. A switching circuit (100; 200) comprising, in combination:
   a first line (132);
   a second line (140);
   a third line (150);
   means for developing a first DC power supply voltage between said second (140) and said first (132) lines, said first DC power supply voltage having a magnitude of a predetermined level;
   means for developing a second DC power supply voltage between said third (150) and said first (132) lines, said second DC power supply voltage having a predetermined level of a magnitude greater than the magnitude of said first DC power supply voltage level;
   a first transistor (110) having a gate, drain means and source means;
   a second transistor (112) having a gate, drain means connected to said first transistor source means, and source means connected to said first line (132);
   first coupling means (140 and 144) including a first diode (144) coupling said first transistor (110) gate to said second line (140);
   second coupling means (152, 154 and 156) including a series combination of at least a second diode (152) and first zener diode means (154 and 156) coupling said first transistor (110) gate to said third line (150);
   accumulated charge discharging means (160 and 162) connected between said gate of the first transistor (110) and said source means of the first transistor (110);
   load means (170) connected to both said drain means of the first transistor (110) and to said third line (150).

2. A switching circuit (100) as recited in claim 1 wherein:
   said first coupling means (140 and 144) further includes a resistor (142) connected in series with at least said first diode (144) between said gate of the first transistor (100) and said second line (140).

3. A switching circuit (100; 200) as recited in claim 1 wherein:
   said accumulated charge discharging means (160 and 162) includes a resistor (162) connected between said gate of the first transistor (110) and said source means of the first transistor (110).

4. A switching circuit (100; 200) as recited in claim 1 wherein:
   said accumulated charge discharging means (160 and 162) includes second zener diode means (160) connected between said gate of the first transistor (110) and said source means of the first transistor (110).

5. A switching circuit (100; 200) as recited in claim 4 wherein:
   said accumulated charge discharging means (160 and 162) further includes a resistor (162) connected between said gate of the first transistor (110) and said source means of the first transistor (110).

6. A switching circuit (200) as recited in claim 1:
   further including a current-steering diode (182) connected to said gate of the second transistor; and wherein
   said first coupling means (140 and 144) further includes a resistor 142 connected in series with at least said first diode (144) between said gate of the first transistor (110) and the current-steering diode (182).

7. A ballast circuit (500) for driving a load that includes at least one gaseous discharge lamp (520 and 522), the ballast circuit (500) comprising in combination:
   an oscillator (512);
   a first line (132);
   a second line (140);
   a third line (150);
   means for developing a first DC power supply voltage of a magnitude of a predetermined level between said second (140) and said first (132) lines,
   means for developing a second DC power supply voltage between said third (150) and said first (132) lines, said second DC power supply voltage having a predetermined level the magnitude of which is greater than the magnitude of said first DC power supply voltage level;
   a switching circuit (100) including,
      a first transistor (110) having a gate, drain means, and source means,
      a second transistor (112) having a gate (182 and 184) coupled to said oscillator (512), drain means connected to said first transistor source means, and source means connected to said first line (132),
      first coupling means (140 and 144) having a first diode (144) coupling said gate of said first transistor (110) to said second line (140),
      second coupling means (152, 154 and 156) having a series combination of at least a second diode (152) and a first zener diode means (154 and 156) coupling said gate of said first transistor (110) to said third line (150), and
      accumulated charge discharging means (160 and 162) connected between said gate of said first transistor (100) and said source means of said first transistor (110), and
   a current-limiting network (516) connected to said drain means of said first transistor (110), connected to said third line (150), and for connection to the gaseous discharge lamps (520 and 522).

8. A ballast circuit (500) as recited in claim wherein:
   said second DC power supply voltage has a ripple component; and
   said oscillator (512) generates a high-frequency signal having a predetermined frequency; and further comprising
   feed-forward means responsive to said ripple and operative to change said oscillator (512) high-frequency signal frequency.

9. A ballast circuit (500) as recited in claim 7 wherein:
   said second DC power supply voltage has a ripple component;
   said oscillator (512) generates a high-frequency signal having a predetermined frequency;
   said current-limiting network (516) conducts a predetermined current level; and
   said ballast circuit (500) further comprises feedback means responsive to said current-limiting network (516) current level and operative to change said oscillator (512) high-frequency signal frequency.

* * * * *